J. A. FRESCO.
Combined Pencil and Line Measurer.
No. 222,687. Patented Dec. 16, 1879.
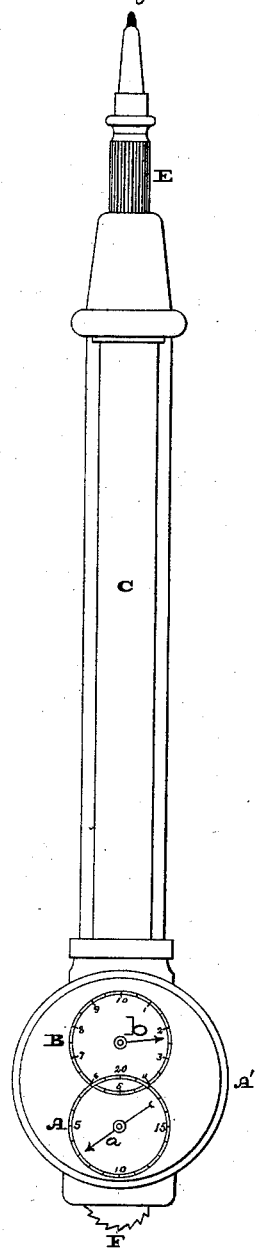
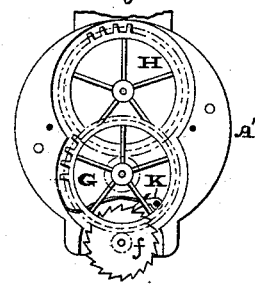
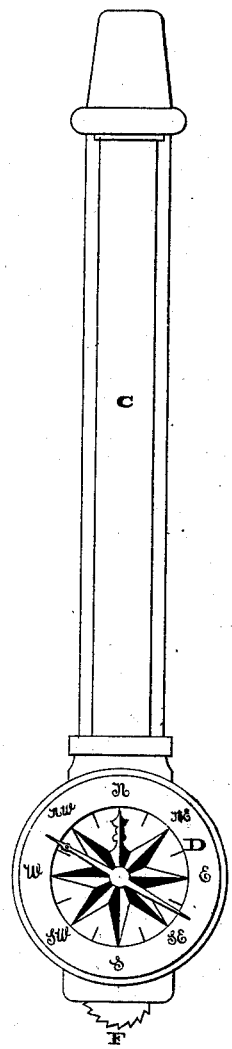
Witnesses:
A. P. Grant,
W. F. Kircher
Inventor:
J. A. Fresco,
by John A. Wiederscheim
ATTORNEY.

UNITED STATES PATENT OFFICE.

JOSEPH A. FRESCO, OF ANGERS, FRANCE.

IMPROVEMENT IN COMBINED PENCIL AND LINE-MEASURER.

Specification forming part of Letters Patent No. 222,687, dated December 16, 1879; application filed June 6, 1879.

*To all whom it may concern:*

Be it known that I, JOSEPH ANDRÉ FRESCO, of Angers, France, have invented a new and useful Improvement in Studio-Curvimeters, which improvement is fully set forth in the following specification and accompanying drawings, in which—

Figures 1 and 2 are views of opposite sides of the device embodying my invention. Fig. 3 is an enlarged view of the interior mechanism thereof.

Similar letters of reference indicate corresponding parts in the several figures.

My invention consists of a combined measuring-instrument, compass, and lead-pencil, forming a convenient article in one.

Referring to the drawings, C represents a stem, to one end of which is secured a casing, A', having mounted thereon at the extreme end a spur-wheel, F, a portion whereof projects beyond the periphery of the casing.

On the axis of the wheel F is secured a pinion, $f$, with which meshes a pinion, G, on the axis of which is secured a pinion, with which meshes a pinion, H, the axis of the wheels G H being mounted on the casing A', and each carrying an index or finger, $a$ $b$, the dials A B whereof are properly secured or formed within the casing.

The dial A is graduated, say, for the distance of twenty kilometers, and the dial B is a multiple of twenty kilometers, in such manner that, owing to the combination of the two dials, two hundred kilometers may be developed.

It is evident that by grasping the stem C and running the wheel F over the map, line, or other plan to be measured or laid off, said wheel rotates and motion is communicated to the wheels G H, and consequently to the indices $a$ $b$, the distance of measurement or traverse of the wheels F thus being indicated by the said indices on the dials A B.

Backward or improper movement of the wheel F is prevented by a spring-pawl, K, suitably connected to the casing A'.

Suppose the distance sought is forty-seven kilometers; the index of dial A will stand at seven, and that of dial B at two, showing $20 \times 2 + 7 = 47$ kilometers.

The scale of the dials will be established according to that adopted by different countries.

It will be seen that the single operation of the wheel F rotates the indices, and the measurement may be immediately made and known.

To the casing or head A', on the side opposite to the dials, there is attached a compass, D, and fitted to the stem C is a lead-holder or pencil-case, E, thus providing a convenient implement in one—namely, a compass and lead-pencil, which will also be found to be convenient attachments to the measuring device.

The stem may have scales engraved or otherwise formed thereon. Curves and irregular figures may be measured as readily as right-lined and other figures and plans.

Having thus described my invention, what I claim as new, and desire to secure by Letters Patent, is—

The stem C, with its head A', having the measuring implement and compass, and with the pencil holder or case, combined and operating substantially as and for the purpose set forth.

In testimony whereof I have signed my name to this specification before two subscribing witnesses.

J. A. FRESCO.

Witnesses:
   ROBT. M. HOOPER,
   A. CALEY.